United States Patent [19]

Hansen et al.

[11] Patent Number: 5,191,053
[45] Date of Patent: Mar. 2, 1993

[54] PREPARATION OF POLYORGANOSILOXANES WITH CONTROLLED LOW-LEVELS OF HYDROXY SUBSTITUTION

[75] Inventors: Sidney A. Hansen, Beaverton; Charles E. Neal, Jr., Midland, both of Mich.

[73] Assignee: Dow Corning Corporation, Midland, Mich.

[21] Appl. No.: 612,655

[22] Filed: Nov. 14, 1990

[51] Int. Cl.$^5$ ............................................. C08G 77/06
[52] U.S. Cl. ...................................... 528/12; 556/467; 556/469
[58] Field of Search ................... 528/12; 556/467, 469

[56] References Cited

U.S. PATENT DOCUMENTS

| | | | |
|---|---|---|---|
| 2,467,976 | 4/1949 | Hyde | 260/448.2 |
| 2,469,888 | 5/1949 | Patnode | 260/448.2 |
| 2,491,843 | 12/1949 | Wilcock | 260/448.2 |
| 2,758,124 | 8/1956 | Schwenker | 260/448.2 |
| 2,779,776 | 1/1957 | Hyde | 260/448.2 |

*Primary Examiner*—Melvyn I. Marquis
*Attorney, Agent, or Firm*—William F. Boley

[57] ABSTRACT

The described process uses aqueous hydrogen chloride as a catalyst to effect the condensation of chloride and hydroxy end-substituted polyorganosiloxanes, in the presence of triorganosilyl endblocker to control chain length. The inventors have discovered that within a range of about 10 to 30 percent aqueous solution of hydrogen chloride, it is possible to produce polyorganosiloxanes with low levels of chloride and hydroxy substitution. Furthermore, it has been found that within this hydrogen chloride range, temperature and hydrogen chloride concentration can be controlled to produce polyorganosiloxane polymers with a reproducible and predictable level of hydroxy substitution.

14 Claims, 1 Drawing Sheet

PREPARATION OF POLYORGANOSILOXANES WITH CONTROLLED LOW-LEVELS OF HYDROXY SUBSTITUTION

BACKGROUND OF THE INVENTION

The present invention relates to an aqueous hydrogen chloride catalyzed process for preparing polyorganosiloxane polymers with controlled low-levels of chloride and hydroxy substitution. Residual chloride and hydroxyl radicals substituted on polyorganosiloxane polymers provide reactive sites on the polymer chain that can cause polymer chain extension. This polymer chain extension results in viscosity shifts of the fluid and consequently reduced shelf life. In addition, the presence of these residual reactive sites are important to the final product physical characteristics and performance. Therefore, it is not only important that chloride and hydroxy substitution be low on polyorganosiloxane polymers, it is also important to be able to control the level of these reactive sites within specified limits. Control of residual hydroxy on the polyorganosiloxane polymers allows a balance to be maintained between the need for adequate shelf life and the need for residual reactive sites which are necessary for the performance of the polymers in many of their end uses.

Current production of polyorganosiloxane polymers, for example polydimethylsiloxane, is a multi-step process. In a typical process, a first step involves hydrolyzing dimethyldichlorosilane and subsequent condensation of the hydrolysate to form an equilibrium mixture of low molecular weight permethylcyclosiloxanes and low molecular weight dimethylsiloxane linears. This condensation product is exhaustively washed to hydrolyze and remove chloride from the polymer. The wash is necessary to provide acceptably low levels of chloride in the final product.

The low molecular weight condensation products, free from chloride, are then run through a polymerization process to create high molecular weight polydimethylsiloxane fluids. Current processes require highly elevated temperatures and accordingly special equipment to run the processes. Also, considerable variability is experienced in the residual amount of hydroxy substitution of the polydimethylsiloxane fluid produced by this process.

Therefore, it is an objective of the present invention to provide a process that can be run at lower temperatures. Lower temperatures allow the use of lower cost corrosion resistant materials, such as plastics, as materials of fabrication for the reactor components. Lower temperature also results in reduced cleavage of organic groups from the silicon atom. Therefore, the polyorganosiloxane polymers will be more uniform because of reduced functional sites and branching typically caused by organic cleavage.

A second objective is to provide a polyorganosiloxane fluid with low levels of chloride and hydroxy substitution. A third objective is to provide a process whereby the level of hydroxy substitution of the product polyorganosiloxane fluid can be controlled. A fourth objective is to provide a process whereby out of specification polyorganosiloxane fluids can be re-processed with minimal detrimental alterations of the fluid. The instant process allows polyorganosiloxane fluids to be re-processed to adjust viscosity and hydroxy levels.

Prior patents teach that strong acids can be used to catalyze the condensation reaction of low molecular weight polyorganosiloxanes. However, the processes taught in the prior patents have generally resulted in polyorganosiloxane fluids with unacceptable high residual levels of chloride and/or hydroxy substitution.

Hyde, U.S. Pat. No. 2,467,976, issued Mar. 30, 1943, describes a method for increasing the average molecular weight of a completely dehydrated polydimethylsiloxane. The process comprises adding a 36 percent aqueous hydrogen chloride (HCl) solution to a polydimethylsiloxane fluid and refluxing the mixture until an increase in viscosity of the siloxane is effected. Hyde lists numerous strong acids which were considered suitable as catalysts for the described process. The strong acids are described as, for example, hydrobromic acid, boric acid, oxalic acid, benzene sulphonic acid, sulphuric acid, and phosphoric acid. A preferred temperature range for carrying out the process is given by Hyde as about 100° C. to about 250° C. Hyde indicates that the siloxanes formed by his described process are not heat stable.

Hyde, U.S. Pat. No. 2,779,776, issued Jan. 29, 1957, teaches that the reaction between a siloxane and an aqueous acid is reversible and that the polymer size of the siloxane at the point of equilibrium of the reversible reaction is determined by the concentration of the acid in the aqueous phase. Hyde teaches the described process can be used to produce siloxanes with hydroxy and chlorine substituted on the ends of the siloxane chains. Broad claims are made for the use of monobasic acids with a dissociation constant of at least 0.01 at 25° C. The acid can be for example, iodic, perchloric, nitric, benzene sulphonic, trichloroacetic, dichloroacetic, trifluroacetic, periodic, hydrogen chloride, hydrogen bromide, and hydrogen iodide. Typical acid concentrations, in aqueous solution, were employed in the range of about 31% to 40% by weight.

Wilcock, U.S. Pat. No. 2,491,843, issued Dec. 20, 1949, describes a process for forming polyorganosiloxane polymers in which some of the silicon atoms are substituted with a hydrogen atom. The claimed process involves contacting an aqueous concentrated HCl solution and a mixture of trimethylchlorosilane and methyldichlorosilane. The process was run at temperatures as high as room temperature. A molar ratio of one part trimethylchlorosilane to at least 5 parts methyldichlorosilane was used. The examples used a starting concentration of 35 weight percent HCl in water.

Patrode, U.S. Pat. No. 2,469,888, issued May 10, 1949, describes a process for producing polyorganosiloxanes using a strong acid as a catalyst. A liquid polymeric organosiloxane whose structural units corresponded substantially to the formula $R_2SiO$ and an organosiloxane having the general formula $R_3SiOSiR_3$ were reacted in the presence of concentrated sulfuric acid.

Schwenker, U.S. Pat. No. 2,758,124, issued Aug. 7, 1956, teaches a continuous process for hydrolyzing an organosilane. The process comprises simultaneously passing a mixture of an organochlorosilane and water, which may contain up to about 32 percent by weight of HCl, into a circulating system. The feed of organochlorosilane and water is continued, with partial overflow of the formed polyorganosiloxanes and acid-containing water of greater HCl concentration (than the original feed comprised). The overflow is separated into the formed polyorganosiloxanes and acid containing water. The acid containing water is recycled into the system. Schwenker teaches the acid concentration in the aqueous phase is not critical and may be varied over a range of about 25 to 36 weight percent of HCl, with little effect on the quality of the final product. Schwenker teaches the temperature can be varied from about 25° C. to 80° C.

The above cited art does not recognize that hydrogen chloride can be used as a catalyst for the condensation of polyorganosiloxanes, end-substituted with hydroxyl radicals and chloride atoms, to produce high molecular weight polyorganosiloxanes with low levels of chloride and hydroxy substitution. The inventors have discovered that by using triorganosilyl radicals as an endblocker to control polymer length, as opposed to acid concentration, the aqueous hydrogen chloride concentration and temperature of the process can be varied within defined ranges to control the level of chloride and hydroxy substitution on the ends of polyorganosiloxane polymers.

The low chloride and hydroxy substituted polyorganosiloxanes formed by the presently described method are useful, for example, as anti-flatulents, antifoam compounds, and as intermediates in the formulation of sealants. Experience suggests that residual hydroxy functionality on polyorganosiloxane polymers can interact with other components of these formulations to affect stability and/or activity of these formulations. Therefore, the ability to control the level of chloride and hydroxy substitution, even when present at low levels, is important in producing stable formulations and formulations with predictable chemical reactivity.

SUMMARY OF INVENTION

Figure 1:
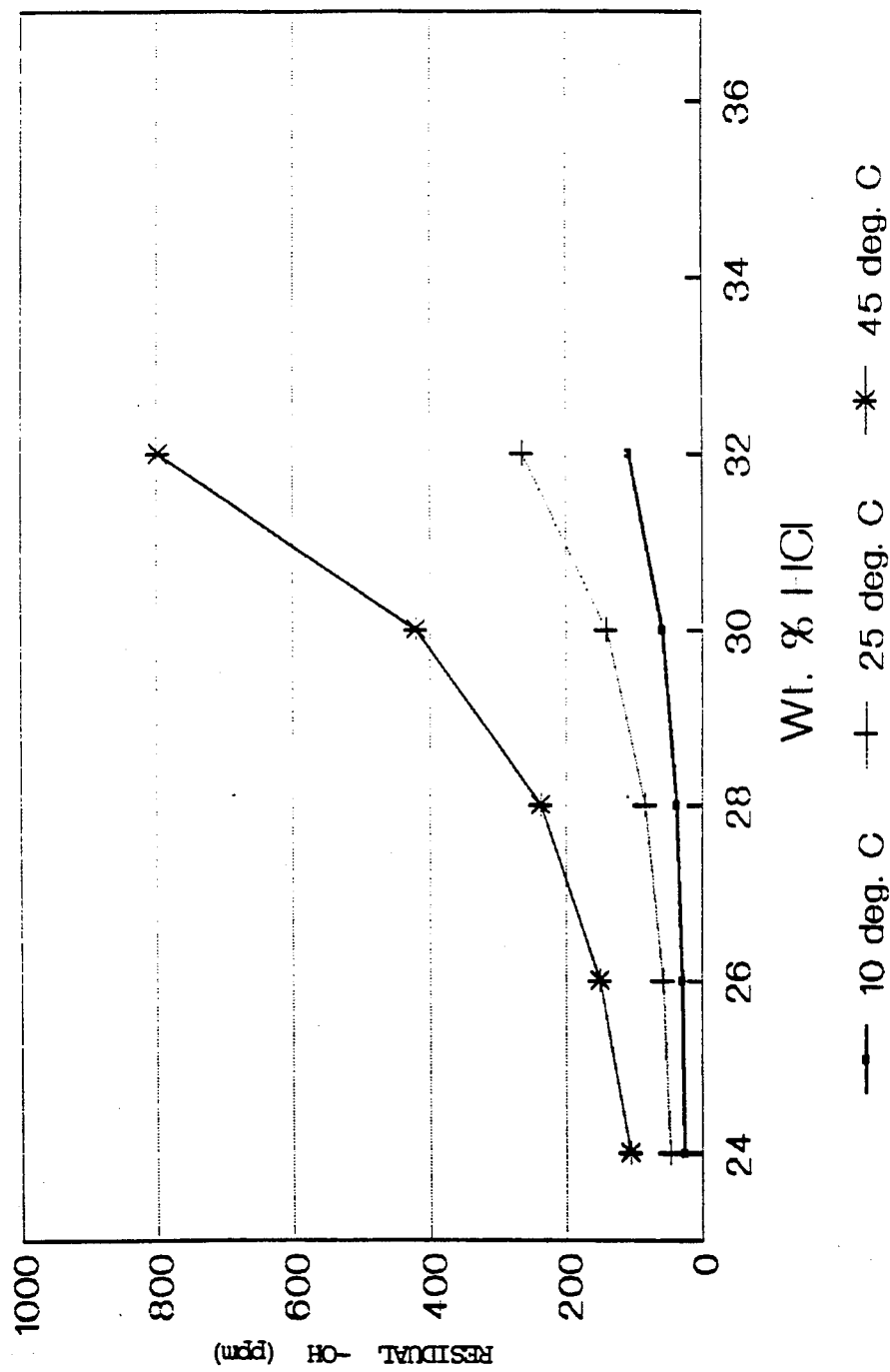
FIG. 1 illustrates the effect of hydrogen chloride concentration and temperature on the residual hydroxy concentration of polyorganosiloxane polymers.

The described process uses aqueous hydrogen chloride as a catalyst to effect the condensation of chloride and hydroxy end-substituted polyorganosiloxanes, in the presence of triorganosilyl endblocker to control chain length. The inventors have discovered that within a range of about 10 to 30 percent aqueous solution of hydrogen chloride, it is possible to produce polyorganosiloxanes with low levels of chloride and hydroxy substitution. Furthermore, it has been found that within this hydrogen chloride range, temperature and hydrogen chloride concentration can be controlled to produce polyorganosiloxane polymers with a reproducible and predictable level of hydroxy substitution.

DESCRIPTION OF THE INVENTION

As previously noted, the acid catalyzed condensation of polyorganosiloxanes is known. However, this acid catalyzed process has not been the method of choice for producing high molecular weight polyorganosiloxanes because of the difficulty of producing polyorganosiloxanes with acceptable low-levels of chloride and hydroxy substitution. The previously known acid catalyzed processes also appeared to produce polyorganosiloxanes with unpredictable variations in the levels of chloride and hydroxy substitution in the final product. Therefore, quite unexpectedly, the inventors have discovered an aqueous hydrogen chloride catalyzed process in which polyorganosiloxanes can easily be produced with predictable and consistent low-levels of chloride and hydroxy substitution. This control of residual chloride and hydroxy substitution is achieved by regulating the aqueous hydrogen chloride concentration and the process temperature within the ranges described herein. Polymer length is controlled by the presence of triorganosilyl endblocker.

Therefore, what is claimed is a process for preparing polyorganosiloxanes containing a controlled low-level of chloride and hydroxy substitution, the process comprising:

(A) contacting a mixture comprising polyorganosiloxanes of formula

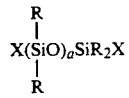

and a source of triorganosilyl endblocker of formula

with an aqueous hydrogen chloride solution; where each X is independently selected from a group consisting of chloride atoms and hydroxyl radicals; each R is independently selected from a group consisting of hydrogen, monovalent hydrocarbon radicals of 1 to 6 carbon atoms, and 1,1,1-trifluoropropyl radical; each $R^1$ is independently selected from a group consisting of hydrocarbon radicals of 1 to 6 carbon atoms and 1,1,1-trifluoropropyl radical; and a is an average value of one to about 2,000;

(B) controlling concentration of hydrogen chloride in the aqueous hydrogen chloride solution at a value within a range of 10 to 30 weight percent;

(C) controlling temperature of the contacted mixture and aqueous hydrogen chloride solution at a value within a range of −40° C. to 100° C.; and (D) recovering product polyorganosiloxanes of formula

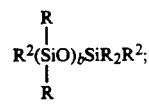

where the polyorganosiloxanes having a potential value for hydroxy substitution within a range of 10 to 1,000 ppm; R is as previously described and $R^2$ is selected from a group consisting of $R^1$, hydroxyl radical, and chloride; and b is an average value within a range defined by the specific value for a of the polyorganosiloxanes of Step (A) to about 2,000.

The described process requires contact between two immiscible phases of reactants. One phase comprises the mixture of polyorganosiloxanes and triorganosilyl source, and product polyorganosiloxanes. The other phase comprises the aqueous hydrogen chloride solution. The interfacial contact between these two phases is important to the described process. Therefore, contact of the two phases must be facilitated by a dispersive means that will provide an adequate dispersion of one of the phases in the other. Such dispersive means may be, for example, mechanical stirring, sonification, agitation of the reactor, high pressure injection, or impingement mixing.

The proportion of the polyorganosiloxane containing mixture to the aqueous hydrogen chloride solution is not critical to the described process. In general, the process can be satisfactorily run where the aqueous hydrogen chloride solution constitutes, by volume, about ten to 90 percent of the dispersion. Preferred is when the aqueous hydrogen chloride solution constitutes, by volume, about 15 to 30 percent of the dispersion.

The polyorganosiloxanes which can be condensed by the instant described process contain on each end either a chloride atom or a hydroxyl radical. The polyorganosiloxanes may be a monodispersed polyorganosiloxane, in which case a can be an integer from one to 2000. The polyorganosiloxanes can be a polydispersed mixture, in which case a is an average value for the number of siloxane units in the range of one to 2000. Preferred, is a polydispersed mixture of polyorganosiloxanes where a is an average value of one to 100. Most preferred is a polydispersed mixture of polyorganosiloxanes where a is an average value of one to 50. The organic portion of the polyorganosiloxanes, R, is selected from a group consisting of hydrogen, hydrocarbon radicals of one to six carbon atoms, and 1,1,1-trifluoropropyl radical. Each R can be independently chosen from the described group. The hydrocarbon radical can be, for example, an alkyl, alkenyl, or aryl radical. The hydrocarbon radical can be, for example, methyl, ethyl, propyl, isopropyl, n-butyl, isobutyl, tert-butyl, sec-butyl, pentyl, hexyl, vinyl, amyl, hexenyl, and phenyl. Preferred, is when all the R groups are methyl.

The hydrogen chloride concentration of the aqueous phase is controlled within a range of 10 to 30 weight percent. The process temperature is controlled within a range of $-40°$ C. to $100°$ C. The inventors postulate that the concentration of chloride and hydroxy substitution present in the final product is a function of the partial pressures of hydrogen chloride and water at the interface with the polyorganosiloxane.

The inventors have discovered that the relationship between the aqueous hydrogen chloride concentration, the process temperature, and the residual chloride and hydroxy substitution can be predicted by the following set of assumptions and equations.

The parts per million (ppm) of hydroxy substitution of the polyorganosiloxanes, after the condensation reaction of the described process, can be predicted by the following equation:

$$ppm\ OH = 34 \frac{(P_{H2O})^{\frac{1}{2}}}{\delta R_{H2O} T} \times 10^6 \qquad (1)$$

$$ppm\ OH = \frac{2(m)(N_{OH})}{\delta} \times 10^6 = \frac{34(N_{OH})}{\delta} \times 10^6$$

$$N_{OH} = \frac{\{n_{OH}\}}{\{V\}} = \frac{(P_{H2O})^{\frac{1}{2}}}{R_{H2O} T}$$

Where:
$N_{OH}$ = normality of OH in fluid as (g-mole/L)
nOH = moles OH fluid (g-mole)
V = volume fluid (L)
$P_{H2O}$ = water partial pressure (mm Hg)
$R_{H2O}$ = water fluid constant = 11.52 (mmHg)(L)/(g-mole)(°K.)
T = temperature (°K.)
m = molecular weight end group (OH)
$\delta$ = density fluid (g/L)
{ } = concentration The ppm of chloride substituted on the polyorganosiloxanes formed during the described process can be predicted by the following equation:

$$ppm\ Cl = 71 \frac{P_{HCl}}{\delta R_{HCl} T} \times 10^6 \qquad (2)$$

Where:

$$ppm\ Cl = \frac{2(m)N_{Cl}}{\delta} \times 10^6 = \frac{71\ N_{Cl}}{\delta} \times 10^6$$

$$N_{Cl} = \frac{\{n_{Cl}\}}{\{V\}} = \frac{P_{HCl}}{R_{HCl} T}$$

$N_{Cl}$ = normality of Cl in fluid (g-mole/L)
$n_{Cl}$ = moles Cl in fluid (g mole)
V = volume fluid (L)
$P_{HCl}$ = HCl partial pressure (mm Hg)
$R_{HCl}$ = HCl fluid constant = 16.64 (mm Hg)(L)/(g-mole)(°K.)
T = temperature (°K.)
m = molecular weight of chlorine
$\delta$ = density of fluid (g/L)

The substituted chloride of the polyorganosiloxane can be further hydrolyzed to hydroxy. Therefore, total hydroxy substitution of the product polyorganosiloxanes can be described by combining equation (1) and (2) to arrive at the following equation:

$$\text{Total OH} = \frac{34}{\delta T} \left[ \frac{(P_{H2O})^{\frac{1}{2}}}{R_{H2O}} + \frac{P_{HCl}}{R_{HCl}} \right] \times 10^6 \qquad (3)$$
(ppm)

Predicted values, based upon equation (3), for residual hydroxy substitution on polyorganosiloxane products are presented in FIG. 1. FIG. 1 illustrates an expected increase in hydroxy substitution with increased temperature. FIG. 1 also illustrates an expected increase of hydroxy substitution with increasing aqueous hydrogen chloride concentration. Above about 30 weight percent hydrogen chloride in water, the expected level of hydroxy substitution rises quickly.

Therefore, based upon these calculations and the examples offered herein, the inventors claim a process wherein the concentration of hydrogen chloride in water is maintained in a range of 10 to 30 weight percent. The lower limit for hydrogen chloride concentration is controlled by the effectiveness of the hydrogen chloride as catalyst. The upper limited for hydrogen chloride concentration is dictated by the desired limit for hydroxy substitution on the product polyorganosiloxanes. It is preferred that the polyorganosiloxanes contain about an equal molar concentration of chloride and hydroxy substitution. In a preferred process, the aqueous hydrogen chloride concentration is maintained at a value within the range of 25 to 30 weight percent. The best control of residual hydroxy levels is achieved when the hydrogen chloride concentration is maintained within a narrow range. It is preferred, that the weight percent of hydrogen chloride, w, does not deviate by more than ±1 weight percent from the desired value, during the running of the process. The most preferred hydrogen chloride concentration is 28±1 weight percent of an aqueous solution. The hydrogen chloride concentration can be controlled by monitoring the aqueous phase within the reactor for hydrogen chloride concentration and making additions of hydrogen chloride or water as required. The hydrogen chloride concentration can be monitored, for example, by on-line measuring of the density or refractory index of the aqueous phase as it is withdrawn from the reactor.

The information presented in FIG. 1 also predicts temperature to be an important parameter in determining the chloride and hydroxy substitution of the polyorganosiloxanes product. To maintain the chloride and hydroxy substitution of the polyorganosiloxanes in the desired range of 10 to 1000 ppm, the temperature is controlled at a value within a range of −40° C. to 100° C. Preferred, is when the temperature is controlled at a value within a range of 10° C. to 50° C. Even more preferred is when the temperature, T, is controlled at a value of T±0.2° C. within the range of 25° C. to 40° C. The temperature can be controlled by standard means, for example, a fluidized sand bath, a water or solvent bath, heating mantle, or forced air.

Control of polymer length of product polyorganosiloxanes is effected by the presence of a source of triorganosilyl endblocker radicals as a mixture with polyorganosiloxanes. The source of triorganosilyl endblocker radicals can be any material which under reaction conditions forms a triorganosilyl radical of formula $R^1_3Si-$, where $R^1$ is independently chosen from a group consisting of hydrocarbon radicals of 1 to 6 carbon atoms and 1,1,1-trifluoropropyl radical. $R^1$ can be, for example, an alkyl, alkenyl, or aryl radical. $R^1$ can be, for example, methyl, ethyl, propyl, isopropyl, n-butyl, isobutyl, tert-butyl, sec-butyl, pentyl, hexyl, vinyl, amyl, hexenyl, and phenyl. Preferred is when all the $R^1$ radicals are methyl.

The source of triorganosilyl radicals can be, for example, a triorganochlorosilane such as trimethylchlorosilane or 5-hexenyldimethylchlorosilane. The source of the triorganosilyl radicals can be, for example, hexamethyldisiloxane.

A useful concentration of triorganosilyl radical is about 0.1 to 25 weight percent of the mixture. A preferred concentration of triorganosilyl radicals is about 0.1 to 5 weight percent of the mixture. In the presence of an aqueous hydrogen chloride solution the triorganosilyl radical will exist as a mixture of triorganochlorosilane and triorganosilanol, the exact ratio to be determined by the hydrogen chloride concentration. The triorganochlorosilane can react with hydroxy end-substituted polyorganosiloxanes to endblock and prevent further polymer lengthening.

It has been discovered by the inventors that the triorganosilyl end blocking rate is considerably faster than the condensation rate. This discovery is important because it allows process equilibrium and consequently the average polyorganosiloxane chain length to be controlled by the triorganosilyl concentration. Typical contact times of the two phases, in order for the described process to reach equilibrium, are in the range of 5 to 45 minutes; as compared to an equilibrium time set by the rearrangement rate of one to 10 hours, when the triorganosilyl endblocker is not present. The equilibrium time for the described process is also dependent upon the interfacial contact between the two phases. The greater the contact area, the faster the process will reach equilibrium.

Recovery of product polyorganosiloxanes can be accomplished by standard means for effecting phase separation of oil and water dispersions. For example, the phases can be separated by stripping, gravitational settling, centrifugation, coalescence, or membrane separation. The recovered aqueous hydrogen chloride containing phase may be recycled to the process. In a preferred mode, a dispersion of reactants and product is continuously removed from a reactor through a coalescer to a gravitational settling vessel where separation of the dispersion into an upper polyorganosiloxane phase and a lower aqueous hydrogen chloride phase occurs. The aqueous hydrogen chloride phase is withdrawn from the settling vessel and recycled to the reactor. The concentration of hydrogen chloride in the recycled aqueous hydrogen chloride can be adjusted by addition of hydrogen chloride or by dilution with water, as required to maintain the desired hydrogen chloride concentration within the reactor. Alternatively, the aqueous hydrogen chloride may be processed by, for example, distillation or stripping to recover anhydrous hydrogen chloride. Product polyorganosiloxanes are recovered for further processing as required.

The recovered product polyorganosiloxanes comprise as a major component entirely organic substituted polysiloxane chains and as a minor component organic substituted chains with an end-terminal hydroxy or chloride substitution. It is generally preferred that not more than about 20 percent of the polyorganosiloxane polymer chains have end-terminal hydroxy groups. The claimed process controls the potential average value for end-terminal hydroxy groups within a range of 10 to 1,000 ppm. The preferred range to control the potential average value for end-terminal hydroxy groups is within a range of 10 to 300 ppm. Even more preferred is to control the potential average value for end-terminal hydroxy groups within a range of 10 to less than 100 ppm. The potential average value for end-terminal hydroxy is expressed as the ppm of hydroxy substitution that would be present on the polyorganosiloxanes if all end-terminal substituted chloride was hydrolyzed to hydroxy. The ppm of end-terminal hydroxy is expressed as the weight of residual hydroxy (i.e., —OH) potentially substituted on a given weight of polyorganosiloxanes.

The product polyorganosiloxanes comprise a mixture of polyorganosiloxanes of varying chain lengths. The average value for the chain lengths of this mixture, b, is expressed as the number of siloxane units, —SiO—, per chain. The value b is restricted to an average value within a range having a lower limit equal to a and an upper limit of about 2,000. Preferred is where b has an average value with a range of greater than a to about 300.

The organic substituent, R, of the product polyorganosiloxanes is as previously described for the polyorganosiloxanes present in the original mixture. The product polyorganosiloxanes also have a substituent $R^2$, which is selected from a group consisting of $R^1$, hydroxyl radical, and chloride. Preferred is where $R^2$ is selected from a group consisting of a methyl, hydroxyl, and chloride radicals.

Typically, the recovered product polyorganosiloxanes undergo a wash step to replace residual chloride, substituted on the polymer, with hydroxy. Thus, the final potential concentration of hydroxy substitution on the product polyorganosiloxanes is the total of the hydroxy substitution and chloride substitution present on the product polyorganosiloxanes.

The product polyorganosiloxanes, of the described reaction, typically go through a stripping process to remove cyclic polyorganosiloxanes and low molecular weight polyorganosiloxane linears. These cyclics and low molecular weight linear materials may be recycled to the described condensation process. It has been found that the equilibrium concentration of cyclics in a polyorganosiloxane fluid, prepared by the described condensation process, is about eight weight percent. Therefore, stripped cyclics fed to the reactor in excess of the equilibrium amount can be rearranged into desired product polyorganosiloxanes.

A further advantage of the process, as described, is that the low temperature at which the process is run minimizes organic cleavage from the silicon atoms. Therefore, undesirable branching of polymer chains is largely avoided. This allows polyorganosiloxanes to be recycled for further adjustment of chain lengths and/or hydroxy substitution without detrimental effects on the resultant polymer.

The following examples are offered as illustrative of the described process. These examples are not intended to limit the scope of the described invention. For the examples, all percents and parts are by weight unless otherwise indicated.

EXAMPLE 1

The effects of aqueous hydrogen chloride concentration and of temperature on the chloride and hydroxy substitution of polyorganosiloxane polymers condensed in the presence of trimethylsilyl endblocker were evaluated. The reactor consisted of a one-liter, 3-neck flask with a bottom drain. One neck of the reactor was fitted with a thermometer. Another neck of the reactor served as a port for a shaft connected to an agitator blade located within the reactor. The other end of the shaft was attached to an external motor for rotating the shaft and blade. The reactor was partially immersed in a water bath to provide temperature control.

The following procedure was employed for each of the aqueous hydrogen chloride concentrations and temperature combinations reported in Table 1. A charge of 375 mL of polydimethylsiloxanes (dp~135) was added to the reactor. The polydimethylsiloxanes contained as a minor component about one percent hexamethyldisiloxane, as a source of trimethylsilyl endblocker. The flask was capped, the external motor adjusted to a speed of approximately 1000 rpm, and the polydimethylsiloxanes stabilized at the desired temperature. Then, 125 ml of aqueous hydrogen chloride at the desired concentration and temperature was added to the reactor. Agitation of the reactor contents was continued for one hour. At the end of the one-hour period, the agitator was stopped and the contents of the reactor allowed to separate. A sample of the polydimethylsiloxane upper phase was removed and further separated by passing through a 0.45 micron membrane, which excluded aqueous hydrogen chloride. The equilibrated sample of polydimethylsiloxanes was analyzed for the presence of hydroxyl groups and chloride.

The remainder of the reactor contents was separated by draining off the bottom aqueous hydrogen chloride layer. The retained upper polydimethylsiloxane component was then treated with 125 mL of water to hydrolyze the residual chloride substituted on the polyorganosiloxanes to hydroxy. The hydrolysis was conducted at the original reaction temperature and stirring speed for about 15 minutes. The resultant dispersion was allowed to set for one hour to separate. An aliquot of the upper layer was passed through a 0.45 micron membrane to separate the polydimethylsiloxanes from the aqueous phase. The separated polydimethylsiloxanes were assayed for residual hydroxy substitution.

Hydroxy substitution of the product polydimethylsiloxanes was assayed by treating the polydimethylsiloxanes with deuterated water, $D_2O$, to exchange the hydroxyl with —OD. Fourier Transform Infrared Spectroscopy (FTIR) was then used to assay for deuteration of the polydimethylsiloxanes and the measured values converted to ppm hydroxyl. The chloride content of the polydimethylsiloxanes was determined by titrating with KOH in the presence of bromocresol purple (BCP) indicator.

The results are presented in Table 1. The headings "ppm Cl in Equilibrate" and "ppm —OH in Equilibrate" denote the concentration of chloride and hydroxyl, respectively, present in the isolated polydimethylsiloxane product before the hydrolysis step. The heading "ppm Total —OH in Product" refers to the hydroxyl present in the polydimethylsiloxane product after residual chloride has been hydrolyzed from the polydimethylsiloxanes and replaced by hydroxyl.

TABLE 1

Effects of Hydrogen Chloride Concentration and Temperature on Residual Chloride and Hydroxy Substitution

| HCl (wt %) | Temperature | | |
|---|---|---|---|
| | 10° C. | 25° C. | 45° C. |
| | ppm Cl in Equilibrate | | |
| 24 | 102.1 | 62.8 | 98.8 |
| 26 | 83.0 | 166.5 | 153.0 |
| 28 | 112.3 | 151.9 | 255.9 |
| 30 | 186.0 | 276.9 | 565.7 |
| 32 | 403.9 | 451.3 | 1206.4 |
| | ppm —OH in Equilibrate | | |
| 24 | 121.6 | 150.7 | 224.8 |
| 26 | 104.6 | 134.2 | 226.5 |
| 28 | 86.3 | 110.0 | 245.3 |
| 30 | 96.5 | 104.9 | 217.2 |
| 32 | 121.5 | 105.2 | 200.6 |
| | ppm Total —OH in Product | | |
| 24 | 94.4 | 163.6 | 253.1 |
| 26 | 117.0 | 144.7 | 274.1 |
| 28 | 95.9 | 151.5 | 280.3 |
| 30 | 108.8 | 163.1 | 354.6 |
| 32 | 173.4 | 202.7 | 463.1 |

The data presented in Table 1, demonstrate a correlation between residual hydroxy substitution on polydimethylsiloxanes and the temperature and the hydrogen chloride concentration of the described process.

EXAMPLE 2

Polyorganosiloxane polymers were prepared in the presence of a 5-hexenyldimethysilyl endblocker using a reaction apparatus similar to that used in Example 1. A charge of 500 g $Cl(Me_2SiO)_{37.7}SiMe_2Cl$, 24 g $Cl(Me_2)Si(CH_2)_4CH=CH_2$, and 72 grams of aqueous hydrochloric acid (8.35% HCl) was placed in the reactor and stirred at 1000 rpm, for one hour, at 25° C. At the end of one hour stirring was stopped, the contents of the reactor were allowed to separate, and the bottom aqueous acid layer drained off. The retained upper polyorganosiloxane component was then stirred at 1000 rpm for one hour with 170 g of water to hydrolyze the residual chloride substituted on the polyorganosiloxanes. The resulting dispersion was heated to about 120° C. to remove the water. The resulting polyorganosiloxanes were heated to 155° C. at 20 mm Hg vacuum to remove volatile species. The polyorganosiloxanes product contained 3.5 ppm Cl, 177 ppm hydroxyl, 0.68% CH$_2$=CH— substitution, and had a viscosity of 290 centistoke (dp~107).

EXAMPLE 3

Polyorganosiloxane polymers were prepared in the presence of a 5-hexenyldimethysilyl endblocker using a reaction apparatus similar to that used in Example 1. A charge of 300 g Cl(Me$_2$SiO)$_{37.7}$SiMe$_2$Cl, 7.1 g Cl(Me$_2$)-Si(CH$_2$)$_4$CH=CH$_2$, and 43 grams of aqueous hydrochloric acid (11.12% HCl) was placed in the reactor and stirred at 1000 rpm, for one hour, at 25° C. At the end of one hour stirring was stopped, the contents of the reactor were allowed to separate, and the bottom aqueous acid layer drained off. The retained upper polyorganosiloxane component was then stirred at 1000 rpm for one hour with 119 g of water to hydrolyze the residual chloride substituted on the polyorganosiloxanes. The resulting dispersion was heated to about 120° C. to remove the water. The resulting polyorganosiloxanes were heated to 155° C. at 20 mm Hg vacuum to remove volatile species. The polyorganosiloxanes product contained 17.6 ppm Cl, 208 ppm hydroxyl, 0.33% CH$_2$=CH— substitution, and had a viscosity of 682 centistoke (dp~221).

What is claimed is:

1. A process for preparing polyorganosiloxanes containing a controlled low-level of chloride and hydroxy substitution, the process comprising:

(A) contacting a mixture comprising polyorganosiloxanes of formula

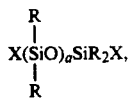

and a source of triorganosilyl endblocker of formula

with an aqueous hydrogen chloride solution; where each X is independently selected from a group consisting of chloride atoms and hydroxyl radicals; each R is independently selected from a group consisting of hydrogen, monovalent hydrocarbon radicals of 1 to 6 carbon atoms, and 1,1,1-trifluoropropyl radical; each R$^1$ is independently selected from a group consisting of hydrocarbon radicals of 1 to 6 carbon atoms and 1,1,1-trifluoropropyl radical; and a is an average value within a range of one to 2000;

(B) controlling concentration of hydrogen chloride in the aqueous hydrogen chloride solution at a value within a range of 10 to 30 weight percent;

(C) controlling temperature of the contacted mixture and aqueous hydrogen chloride solution at a value within a range of −40° C. to 100° C.; and (D) recovering product polyorganosiloxanes of formula

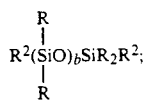

where the product polyorganosiloxanes have a potential value for hydroxy substitution within a range of 10 to 1,000 ppm; R is as previously described, R$^2$ is selected from a group consisting of R$^1$, hydroxyl, and chloride; and b is an average value within a range defined by the specific value for a of the polyorganosiloxanes of Step (A) to about 2,000.

2. A process according to claim 1, where the source of triorganosilyl endblocker is a triorganochlorosilane.

3. A process according to claim 1, where triorganosilyl is present at a concentration of about 0.1 to 5 weight percent of the mixture.

4. A process according to claim 1, where X is hydroxyl.

5. A process according to claim 1, where R is methyl.

6. A process according to claim 1, where a is an average value within a range of one to 50.

7. A process according to claim 1, where the concentration of hydrogen chloride in the aqueous hydrogen chloride solution is a value within a range of 25 to 30 weight percent.

8. A process according to claim 7, where weight percent of hydrogen chloride, w, is controlled at a value of ±1 weight percent.

9. A process according to claim 1, where the temperature is a value within a range of 10° C. to 50° C.

10. A process according to claim 1, where the temperature, T, is controlled at a value T+0.2° C., within a range of 25° C. to 40° C.

11. A process according to claim 1, where aqueous hydrogen chloride remaining after the recovery of the product polyorganosiloxanes is recycled to the process.

12. A process according to claim 1, where the potential value for hydroxy substitution is within a range of 10 to 300 ppm.

13. A process according to claim 1, where the potential value for hydroxy substitution is within a range of 10 to less than 100 ppm.

14. A process for preparing polyorganosiloxanes containing a controlled low-level of chloride and hydroxy substitution, the process comprising:

(A) contacting a mixture comprising polyorganosiloxanes of formula

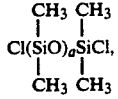

and a source of trimethylsilyl endblocker with an aqueous hydrogen chloride solution; where a is an average value within a range of one to 50;

(B) controlling concentration of hydrogen chloride, w, in the aqueous hydrogen chloride solution such that w does not vary more than ±1 weight percent, within a range of 25 to 30 weight percent;

(C) controlling temperature, T, of the contacted mixture and aqueous hydrogen chloride solution at a value of T±0.2° C., within a range of 25° C. to 40° C.; and (D) recovering product polyorganosiloxanes of formula

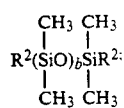

where the product polyorganosiloxanes have a potential value for hydroxy substitution within a range of 10 to 300 ppm; $R^2$ is selected from a group consisting of methyl, hydroxyl, and chloride; and b is an average value within a range defined by the specific value for a of the polyorganosiloxanes of Step (A) to about 300.

* * * * *